United States Patent
Sato

(10) Patent No.: US 9,399,957 B2
(45) Date of Patent: Jul. 26, 2016

(54) AIR INTAKE APPARATUS FOR INTERNAL COMBUSTION ENGINE

(71) Applicant: DENSO CORPORATION, Kariya, Aichi-pref. (JP)

(72) Inventor: Shingo Sato, Nagoya (JP)

(73) Assignee: DENSO CORPORATION, Kariya (JP)

( * ) Notice: Subject to any disclaimer, the term of this patent is extended or adjusted under 35 U.S.C. 154(b) by 63 days.

(21) Appl. No.: 14/615,812

(22) Filed: Feb. 6, 2015

(65) Prior Publication Data

US 2015/0252755 A1  Sep. 10, 2015

(30) Foreign Application Priority Data

Mar. 5, 2014  (JP) .................................. 2014-42980

(51) Int. Cl.
*F02M 35/10* (2006.01)
*F02D 13/02* (2006.01)
*F02B 27/02* (2006.01)

(52) U.S. Cl.
CPC ........ *F02D 13/0226* (2013.01); *F02B 27/0215* (2013.01); *F02B 27/0263* (2013.01); *Y02T 10/121* (2013.01); *Y02T 10/146* (2013.01)

(58) Field of Classification Search
CPC ..................... F02D 41/0002; F02M 35/10039; F02M 35/10072; F02M 35/104; F02M 35/108; F02B 27/02; F02B 27/0263
USPC ............. 123/184.24, 184.34, 184.42, 184.47, 123/184.55, 184.59
See application file for complete search history.

(56) References Cited

U.S. PATENT DOCUMENTS

| | | | | |
|---|---|---|---|---|
| 5,638,785 A | * | 6/1997 | Lee | F02B 27/02 123/184.35 |
| 5,871,033 A | * | 2/1999 | Keinert | B60H 1/2203 138/43 |
| 2001/0010213 A1 | * | 8/2001 | Umino | F02B 27/0284 123/184.53 |
| 2002/0139340 A1 | * | 10/2002 | Matsumoto | F02B 27/0263 123/184.55 |
| 2008/0223347 A1 | * | 9/2008 | Hommes | F01M 13/022 123/572 |
| 2013/0263811 A1 | * | 10/2013 | Sato | F02M 35/1255 123/184.57 |
| 2014/0014056 A1 | | 1/2014 | Sato | |

FOREIGN PATENT DOCUMENTS

| | | |
|---|---|---|
| JP | H10-122066 A | 5/1998 |
| JP | 2005-325824 A | 11/2005 |
| JP | 2010-151062 A | 7/2010 |

\* cited by examiner

*Primary Examiner* — John Kwon

(57) ABSTRACT

A variable intake air device forms a long port and a short port in each of branches of an intake air manifold. The variable intake air device switches between the long port and the short port. A gas introduction device draws gas into each of the branches. When the engine is in a high load region, the variable intake air device uses the long port, when an engine rotation speed is less than a predetermined rotation speed, and uses the short port, when the engine rotation speed is greater than or equal to the predetermined rotation speed. When the engine is in a low load region, the variable intake air device switches between the long port and the short port according to the engine rotation speed.

3 Claims, 6 Drawing Sheets

AIR INTAKE APPARATUS FOR INTERNAL COMBUSTION ENGINE

CROSS REFERENCE TO RELATED APPLICATION

This application is based on reference Japanese Patent Application No. 2014-42980 filed on Mar. 5, 2014, the disclosure of which is incorporated herein by reference.

TECHNICAL FIELD

The present disclosure relates to an air intake apparatus for an internal combustion engine. The present disclosure may relate to an air intake apparatus including a variable intake air mechanism, which is to switch a port length for each branch of an intake air manifold, and a gas introduction mechanism, which is to draw gas such as EGR gas into the branch.

BACKGROUND

For example, Patent Document 1 discloses a conventional variable intake air mechanism. The variable intake air mechanism disclosed in Patent Document 1 includes a port switching valve enabled to switch between a long port and a short port, which are different in port length, for each of branches of an intake air manifold. For example, as shown in FIG. 7, the conventional port switching valve is controlled to use the long port in a CLOSE region, in which the engine is at a high load and at a low rotation speed, to harness pulsation to cause an inertia supercharging effect thereby to enhance an output power. The conventional port switching valve is further controlled to use the short port in an OPEN region other than the CLOSE region. More specifically, the conventional variable intake air mechanism throttles intake air in a region, in which the engine is at a low load less than a predetermined value THR1. In this low load region, the inertia supercharging effect caused by pulsation is not needed. Therefore, the conventional variable intake air mechanism uses the long port regularly without causing the port switching valve to switch the port length.

For example, Patent Document 2 discloses a conventional gas introduction mechanism. The conventional gas introduction mechanism disclosed in Patent Documents 2 has a gas passage, which distributes introduced gas such as EGR gas into each of branches of an intake air manifold. The conventional gas introduction mechanism is enabled to change an opening area of the gas passage for each branch thereby to reduce variation in introduction gas among cylinders of the engine.

(Patent Document 1)
Publication of unexamined Japanese patent application No. 2010-151062
(Patent Document 2)
Publication of unexamined Japanese patent application No. 2012-219626

It is noted that, in the conventional gas introduction mechanism disclosed in Patent Document 2, as the engine rotation speed changes, pulsation caused in intake air changes accordingly. Consequently, distribution of introduced gas into the cylinders changes accordingly. It is further noted that, the opening area of the gas passage to each branch is constant regardless of change in the rotation speed of the engine. Therefore, even though distribution of introduced gas is desirable in a certain operation state, the distribution may be exacerbated in a state other than the certain operation state when the rotation speed of the engine is at a different value.

FIG. 8 and FIG. 9 show a simulation result produced by a CAE analysis to verify variation in EGR gas flow among cylinders. As in FIG. 8, in a case where a short port is used in a low load region, variation among cylinders is within a band of 0.5% on either side when the engine rotation speed is at 1000 rpm or 2000 rpm. To the contrary, in the same case, variation among cylinders may be substantially on or beyond a band of 1.0% on either side when the engine rotation speed is at 3200 rpm or 4400 rpm.

To the contrary, as in FIG. 9, in a case where a long port is used in a low load region, variation among cylinders may be substantially on or beyond a band of 1.0% on either side when the engine rotation speed is at 2000 rpm. In the same case, variation among cylinders is within a band of 0.5% on either side when the engine rotation speed is at other rotation speeds than 2000 rpm. As described above, operation environment, such as differential pressure through the gas passage caused by pulsation may differ according to the engine rotation speed and the throttle position (engine load). Therefore, combination of the gas introduction mechanism of Patent Document 2 and the intake air manifold, which is equipped with the variable intake air mechanism of Patent Document 1, may not enable to reduce variation in introduced gas among the cylinders sufficiently.

SUMMARY

It is an object of the present disclosure to produce an air intake apparatus for an engine, the intake apparatus configured to reduce variation in introduced gas among cylinders in different operational regions of the engine.

According to an aspect of the present disclosure, an air intake apparatus is for an internal combustion engine. The air intake apparatus comprises an intake air manifold configured to draw intake air into each of cylinders of the internal combustion engine. The air intake apparatus further comprises a variable intake air device forming a long port and a short port in each of branches of the intake air manifold. The long port and the short port have different port lengths. The variable intake air device is configured to switch between the long port and the short port. The air intake apparatus further comprises a gas introduction device configured to draw gas, which is different from intake air, into each of the branches. The internal combustion engine is in a high load region when being at a load greater than or equal to a predetermined load. The internal combustion engine is in a low load region when being at a load less than the predetermined load. The internal combustion engine is configured to operate at a rotation speed as an engine rotation speed. The variable intake air device is configured, when the internal combustion engine is in the high load region, to use the long port in a case where the internal combustion engine is in a region in which the engine rotation speed is less than a predetermined rotation speed and to use the short port in a case where the internal combustion engine is in a region in which the engine rotation speed is greater than or equal to the predetermined rotation speed. The variable intake air device is configured, when the internal combustion engine is in the low load region, to switch between the long port and the short port according to the engine rotation speed.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

As follows, embodiments of the present disclosure will be described in detail.

First Embodiment

Figure 1:
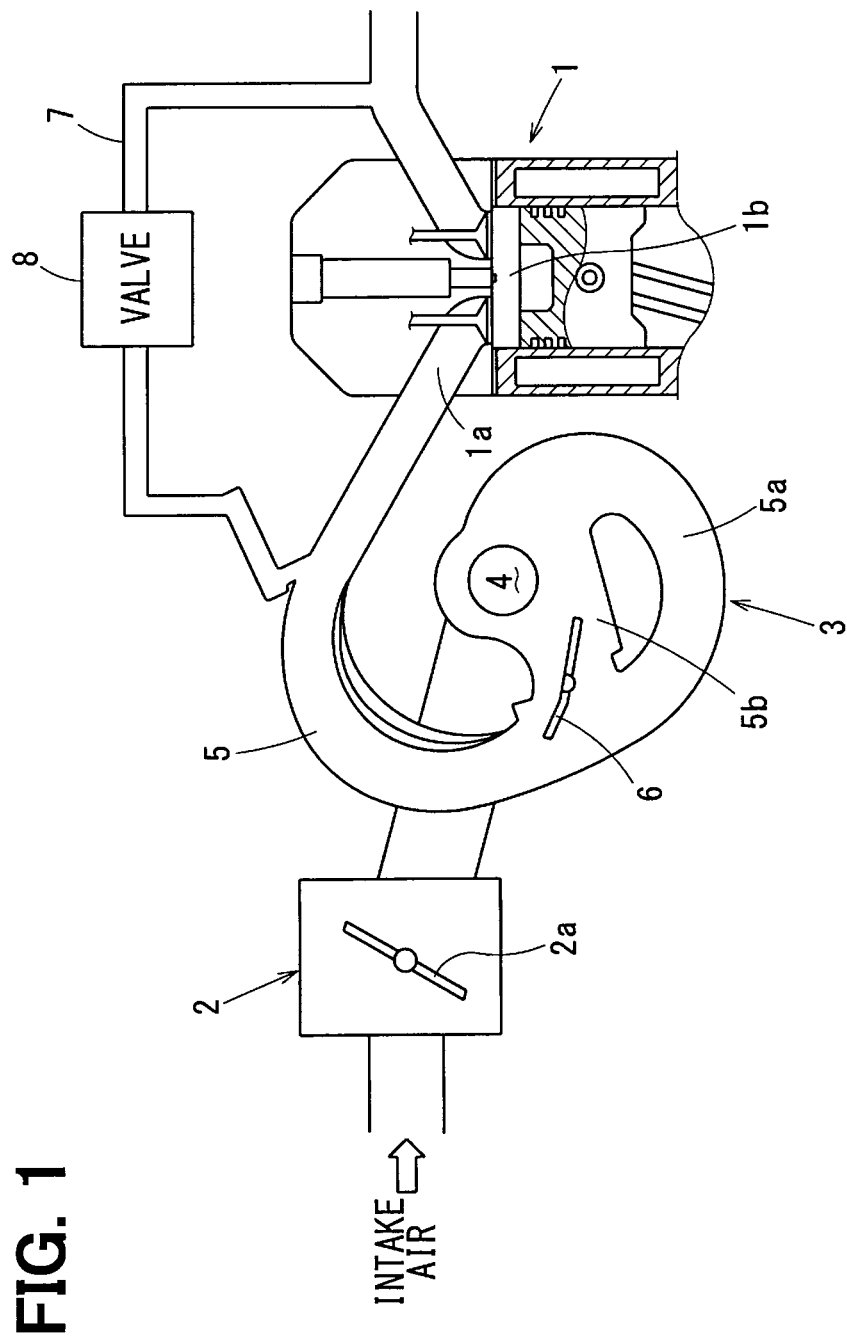
FIG. 1 is a schematic diagram showing an intake and exhaust system for an engine.
Figure 2:
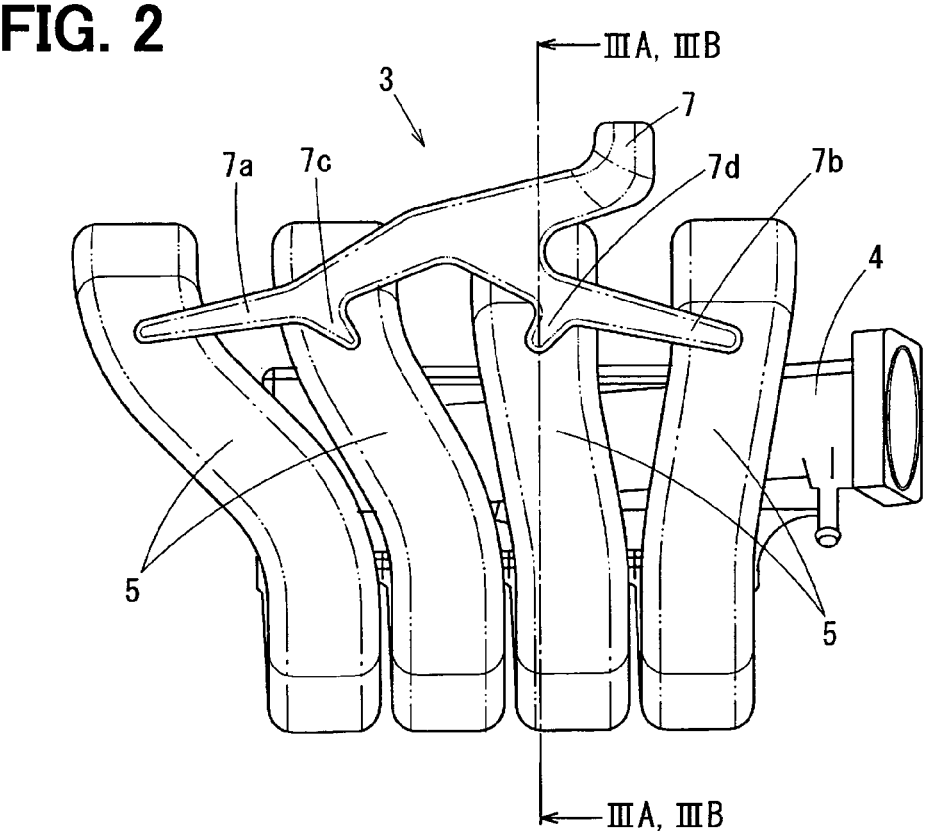
FIG. 2 is an overview showing an intake air manifold for the intake and exhaust system.

An engine 1 according to the first embodiment is, for example, an inline four-cylinder engine. The engine 1 is equipped with an EGR device, which is to recirculate a part of exhaust gas as EGR gas into an intake air side. As shown in FIG. 1, an intake air manifold 3 is equipped to an intake air system of the engine 1. The intake air manifold 3 is located on the downstream side of an electronic throttle device 2 relative to an intake air flow. The electronic throttle device 2 accommodates a throttle valve 2a. As shown in FIG. 2, the intake air manifold 3 includes a collector unit 4 and multiple branches 5. The collector unit 4 is in a tubular shape. The brunches 5 are branched from the collector unit 4. The collector unit 4 has one end relative to the longitudinal direction. The one end of the collector unit 4 is on the right end side in FIG. 2 and opens. The one end of the collector unit 4 forms a connection port connected to an outlet of the electronic throttle device 2. The connection port receives air flow, which is controlled with the throttle valve 2a.

Figure 3A:
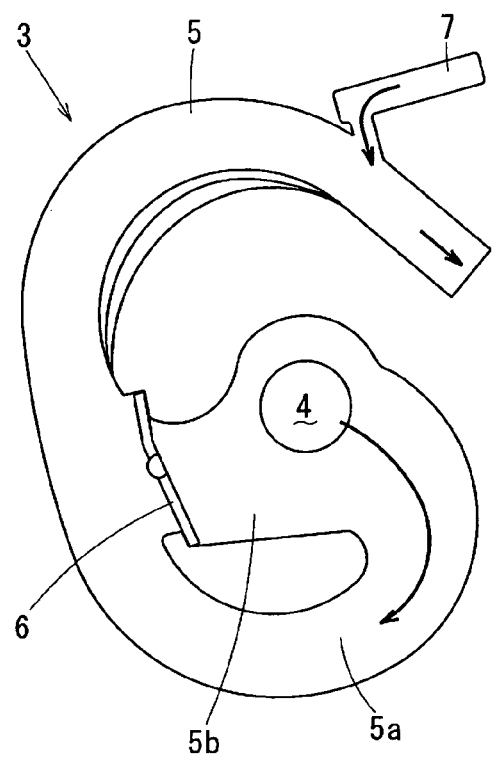
FIG. 3A is a schematic view showing the intake air manifold in a state where a short port is closed.
Figure 3B:
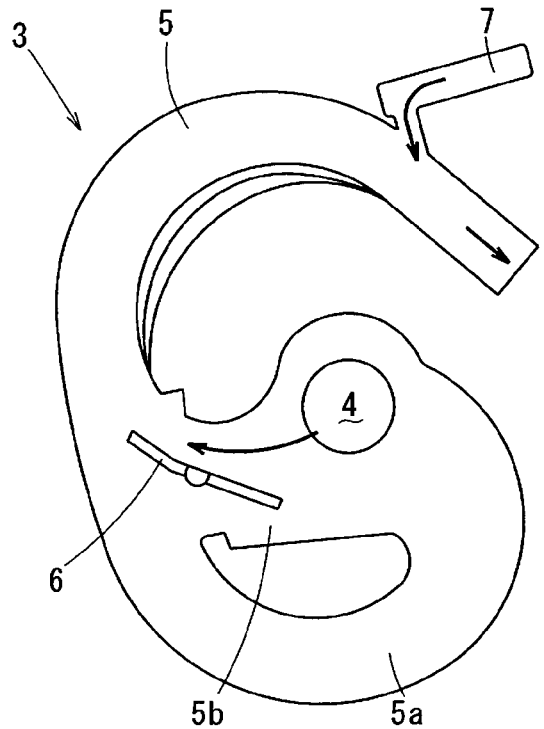
FIG. 3B is a schematic view showing the intake air manifold in a state where the short port is opened.

The number of the multiple branches 5 is the same as the number of cylinders of the engine 1. According to the first embodiment, the engine has four cylinders, and therefore, the number of the branches 5 is four correspondingly. Each of the branch 5 has a downstream end on the opposite side of the collector unit 4, and the downstream end is connected with a corresponding intake port 1a (refer to FIG. 1) of the engine 1. As shown in FIGS. 3A and 3B, each branch 5 has a long port 5a and a short port 5b. The long port 5a has a long port length, and the short port 5b has a short port length. Each branch 5 is equipped with a port switching valve 6, which is configured to open and close the short port 5b. That is, each branch 5 is configured to switch between the long port 5a and the short port 5b selectively according to an opening-and-closing state of the port switching valve 6. Specifically, as shown by arrows in FIG. 3A, the port switching valve 6 closes the short port 5b, thereby to draw intake air, which flows into the collector unit 4, to pass through the long port 5a and to flow into a combustion chamber 1b (FIG. 1) of the engine 1. To the contrary, as shown by arrows in FIG. 3B, the port switching valve 6 opens the short port 5b, thereby to draw intake air, which flows into the collector unit 4, to pass through the short port 5b and to flow into the combustion chamber 1b (FIG. 1) of the engine 1.

Referring back to FIG. 1, the EGR device includes an EGR passage 7 and an EGR valve 8. The EGR passage 7 is configured to recirculate EGR gas from an exhaust system of the engine 1 to the intake air system of the engine 1. The EGR valve 8 is configured to control a quantity of EGR gas flowing through the EGR passage 7. An EGR cooler may be equipped on the upstream side (exhaust gas side) of the EGR valve 8 to cool EGR gas. The EGR passage 7 is equipped on the downstream side (intake air side) of the EGR valve 8. Referring back to FIG. 2, the EGR passage 7 branches into a first gas passage 7a and a second gas passage 7b. A third gas passage 7c further branches off from the first gas passage 7a. A fourth gas passage 7d further branches off from the second gas passage 7b. The first to fourth gas passages 7a to 7d are connected to the branches 5 of the intake air manifold 3, respectively, thereby to draw EGR gas into the branches 5, respectively.

(Operation and effect)

Figure 4:
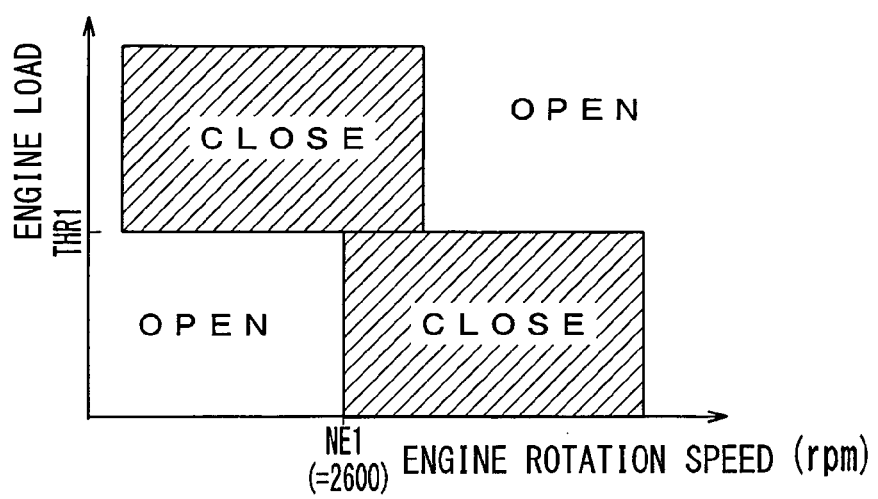
FIG. 4 is a view showing a data map defining an OPEN region and a CLOSE region of a port switching valve, according to a first embodiment.

An opening-and-closing control is implemented on the port switching valves 6, which are accommodated in the branches 5 of the intake air manifold 3, respectively. The opening-and-closing control is implemented according to, for example, a switching data map shown in FIG. 4. The switching data map is stored in, for example, a memory device included in an electronic control unit (ECU). The ECU is configured to control an operation state of the engine 1. The switching data map includes an OPEN region and a CLOSE region. In the OPEN region, the port switching valve 6 opens the short port 5b. In the CLOSE region, the port switching valve 6 closes the short port 5b. The OPEN region or the CLOSE region is selected according to an engine rotation speed and an engine load. The engine rotation speed corresponds to a horizontal axis. The engine load corresponds to a vertical axis. The engine load may be replaced with a throttle position.

Figure 7:
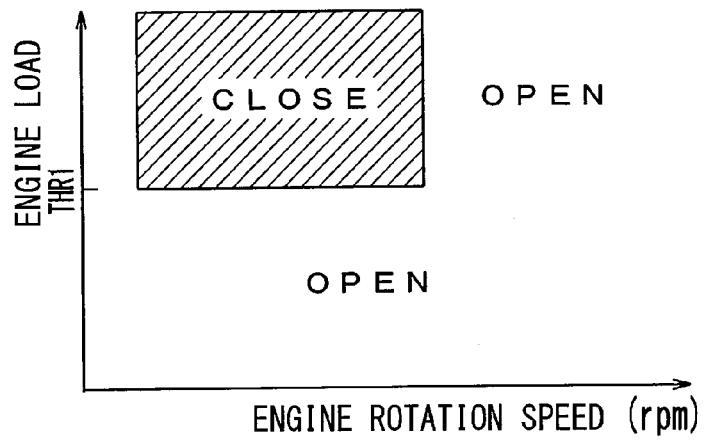
FIG. 7 is a view showing a data map defining an OPEN region and a CLOSE region of a port switching valve, according to a prior art.
Figure 8:
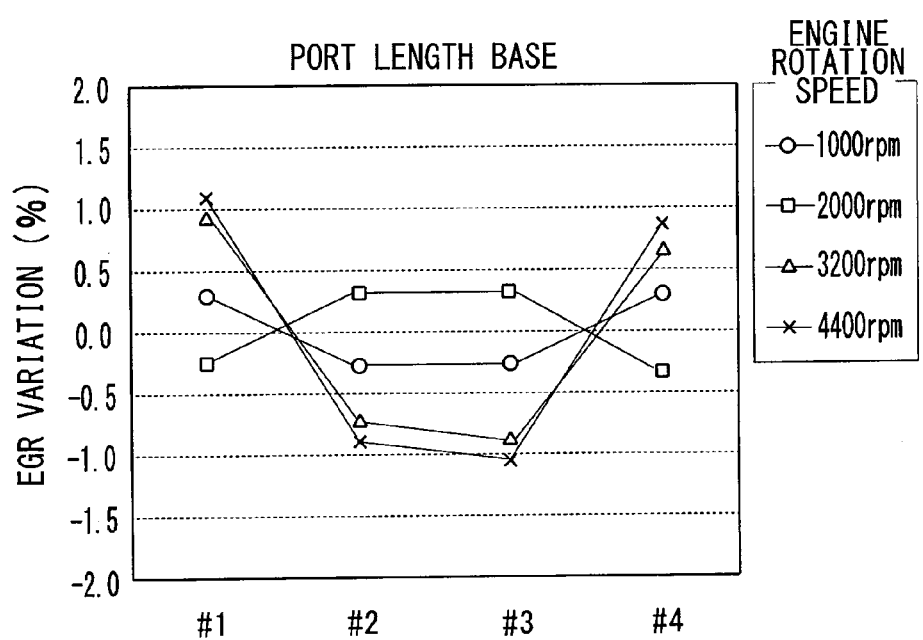
FIG. 8 is a graph showing variation in EGR gas among cylinders, in a case where a short port is used, according to a comparative example.
Figure 9:
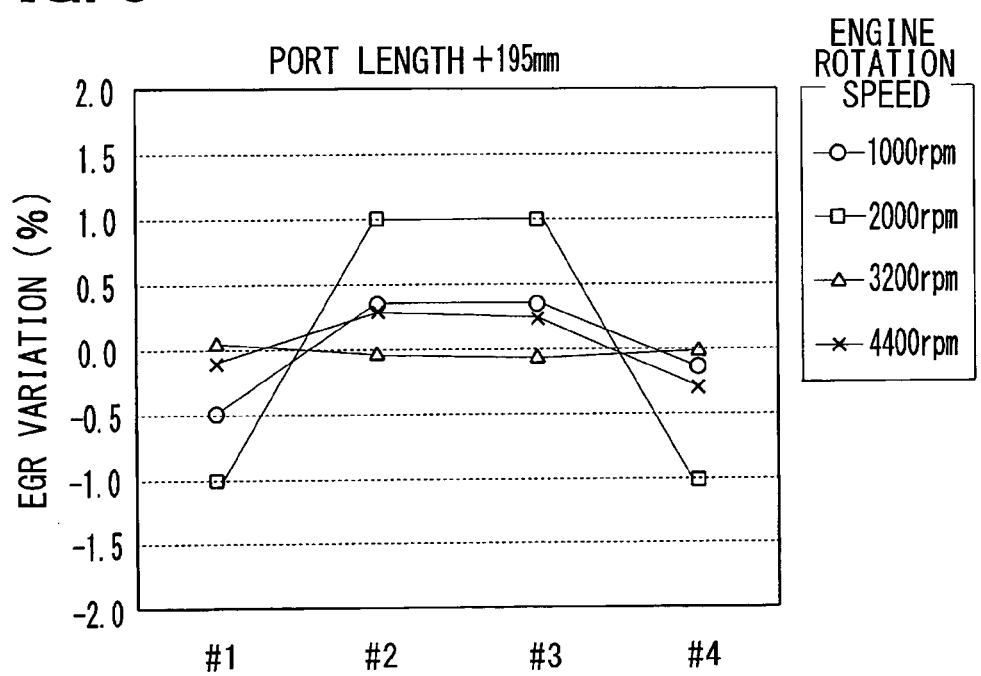
FIG. 9 is a graph showing variation in EGR gas among cylinders, in a case where a long port is used, according to a comparative example.

The present configuration has one feature to switch a port length in a low load region, in which the engine load is less than a value THR1. The one feature may be one difference from the conventional variable intake air system disclosed in Patent Document 1. Specifically, for example, the OPEN region is set in a low load and low rotation speed region, in which the engine rotation speed is less than a predetermined rotation speed NE1. Further, the CLOSE region is set in a low load and high rotation speed region, in which the engine rotation speed is higher than the predetermined rotation speed NE1. In the switching data map exemplified in FIG. 4, the predetermined rotation speed NE1 is 2600 rpm. That is, the port switching valve 6 opens the short port 5b in the low load and low rotation speed region thereby to use the short port 5b. In addition, the port switching valve 6 closes the short port 5b in the low load and high rotation speed region thereby to use the long port 5a. It is noted that, in a high load region, in which the engine load is greater than the value THR1, an operation is implemented similarly to the conventional example shown in FIG. 7. Specifically, in the high load region, the CLOSE region is set in a region, in which the engine rotation speed is less than the predetermined rotation speed NE1. In addition, the OPEN region is set in a region, in which the engine rotation speed is higher than the predetermined rotation speed NE1.

Figure 5:
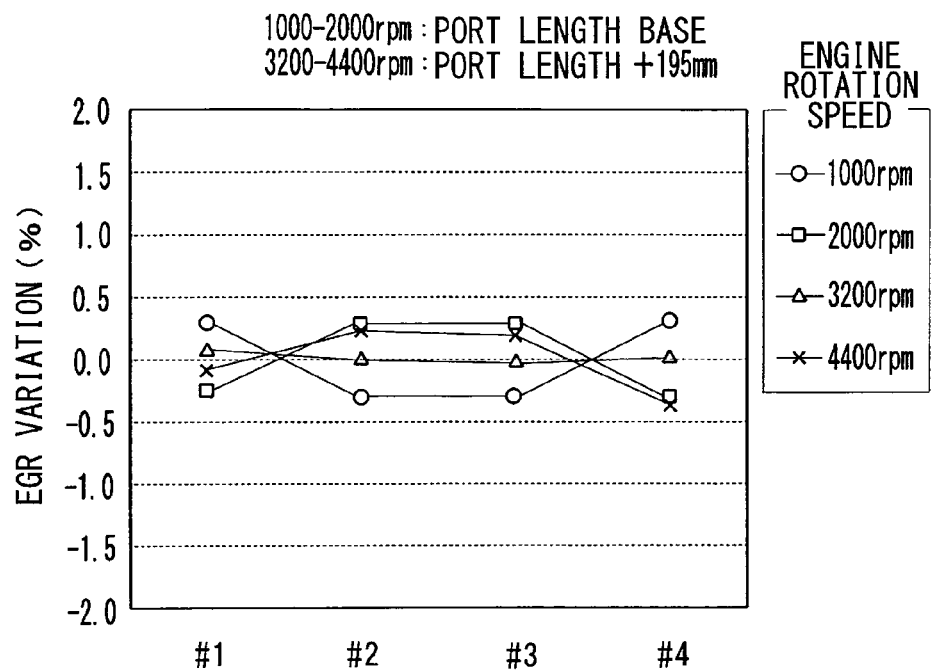
FIG. 5 is a graph showing variation in EGR gas among cylinders according to the first embodiment.

Conventionally, EGR gas flow may cause a large variation among cylinders in the low load region. To the contrary, the present configuration controls the opening-and-closing operation of the port switching valves 6 according to the switching data map shown in FIG. 4 thereby to change the port length in the low load region. Thus, the present configuration may enable to reduce a variation in EGR gas flow among cylinders in the low load region. FIG. 5 shows a simulation result of a CAE analysis. The simulation result shows a verification result of a variation in EGR gas flow (EGR variation) among the cylinders. The simulation result shows that variation among cylinders stay within a band of 0.5% on either side at all the engine rotation speed as verified. In FIG. 5, the notations #1, #2, #3, and #4 correspond to the first cylinder, the second cylinder, the third cylinder, and the fourth cylinder, respectively, in the four-cylinder engine 1.

As described above, the conventional configuration may not switch the port length in the low load region. To the contrary, the present configuration switches the port length in the low load region according to the engine rotation speed. In this way, the present configuration is enabled to reduce variation in EGR gas flow among the cylinders throughout a wide rotation speed range from the low rotation speed region to the high rotation speed region. In addition, the first embodiment may enable to implement the operation simply by controlling the opening-and-closing operation of the port switching valve 6 according to the switching data map. Therefore, the first embodiment may enable to reduce variation in EGR gas flow among cylinders at low cost, without additional components, additional configuration, and/or the like.

As follows, other embodiments according to the present disclosure will be described.

Second Embodiment

The first embodiment is configured to control the opening-and-closing operation of the port switching valve 6 according to the switching data map. It is noted that, the OPEN region and the CLOSE region in the switching data map may vary in dependence upon a model of the engine 1, the shape of the intake air manifold 3, and/or the like. That is, it is not limited to apply the switching data map shown in FIG. 4 to all kinds of the engines 1. The OPEN region and the CLOSE region may be arbitrarily set in the switching data map according to the model of the engine 1, the shape of the intake air manifold 3, and/or the like.

Figure 6:
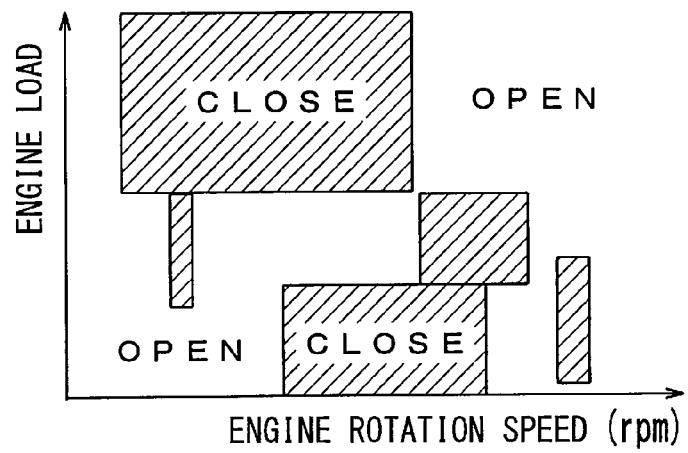
FIG. 6 is a view showing a data map defining an OPEN region and a CLOSE region of a port switching valve, according to a second embodiment.

FIG. 6 shows one example of the switching data map according to the second embodiment. The switching data map shown in FIG. 6 is one example configured to change the port length further broadly according to the engine rotation speed and the engine load additionally in the low load region. In this way, a configuration may be employed to set the OPEN region and the CLOSE region in the switching data map arbitrarily according to the model of the engine 1, the shape of the intake air manifold 3, and/or the like. Thus, the configuration may be enabled to optimize distribution of EGR-gas quantity among the branches 5 of the intake air manifold 3.

(Modification)

The first and second embodiments employ the configurations each to draw EGR gas into the branches 5 of the intake air manifold 3. It is noted that, the operation fluid is not limited to EGR-gas. The present disclosure may be applicable to a configuration to distribute, for example, blowby gas, which leaks from the combustion chamber 1b of the engine 1 into a crankcase, and/or fuel vapor, which is caused in a fuel tank.

The present disclosure may relate to an air intake apparatus for an internal combustion engine. The air intake apparatus includes the intake air manifold, the variable intake air device, and the gas introduction device. The intake air manifold is configured to draw intake air into each of cylinders of the internal combustion engine. The variable intake air device forms the long port and the short port in each of the branches of the intake air manifold. The long port and the short port have different port lengths. The variable intake air device is configured to switch between the long port and the short port. The gas introduction device is configured to draw gas, which is different from intake air, into each of the branches. The internal combustion engine is in the high load region when being at a load greater than or equal to the predetermined value. The internal combustion engine is in the low load region when being at a load less than the predetermined value. The internal combustion engine is configured to operate at a rotation speed as the engine rotation speed. When the internal combustion engine is in the high load region, the variable intake air device is configured to use the long port in a case where the internal combustion engine is in a region in which the engine rotation speed is less than a predetermined rotation speed. When the internal combustion engine is in the high load region, the variable intake air device is configured to use the short port in a case where the internal combustion engine is in a region in which the engine rotation speed is greater than or equal to the predetermined rotation speed. When the internal combustion engine is in the low load region, the variable intake air device is configured to switch between the long port and the short port arbitrarily according to the engine rotation speed.

According to the present disclosure, the variable intake air device uses the long port when the internal combustion engine is in the high load region and is in the region, in which the engine rotation speed is lower than the predetermined rotation speed. In this way, the variable intake air device is enabled to harness the inertia supercharging effect caused by pulsation to enhance output power. To the contrary, the variable intake air device uses the short port when the internal combustion engine is in the high load region and is in the high rotation speed region, in which the variable intake air device is hardly enabled to harness the inertia supercharging effect. In addition, when the internal combustion engine is in the low load region, the variable intake air device need not the inertia supercharging effect. In this case, the variable intake air device is configured to switch between the long port and the short port arbitrarily according to the engine rotation speed. Specifically, the gas introduction device may be configured to switch between the long port and the short port in consideration of optimization of a quantity of gas distributed to each of the branches with the gas introduction device. In this way, variation in gas among the cylinders may be reduced.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. An air intake apparatus for an internal combustion engine, the air intake apparatus comprising:
    an intake air manifold configured to draw intake air into each of cylinders of the internal combustion engine;
    a variable intake air device forming a long port and a short port in each of branches of the intake air manifold, the long port and the short port having different port lengths, the variable intake air device configured to switch between the long port and the short port; and
    a gas introduction device configured to draw gas, which is different from intake air, into each of the branches, wherein
    the internal combustion engine is in a high load region when being at a load greater than or equal to a predetermined load,
    the internal combustion engine is in a low load region when being at a load less than the predetermined load,
    the internal combustion engine is configured to operate at a rotation speed as an engine rotation speed,
    the variable intake air device is configured, when the internal combustion engine is in the high load region,
    to use the long port in a case where the internal combustion engine is in a region in which the engine rotation speed is less than a predetermined rotation speed and to use the short port in a case where the internal combustion engine is in a region in which the engine rotation speed is greater than or equal to the predetermined rotation speed, and
    the variable intake air device is configured, when the internal combustion engine is in the low load region, to switch between the long port and the short port according to the engine rotation speed.

2. The air intake apparatus according to claim 1, wherein
    the variable intake air device is configured, when the internal combustion engine is in the low load region, to switch between the long port and the short port in consideration of optimization of a quantity of gas, which is distributed to each of the branches with the gas introduction device.

3. The air intake apparatus according to claim 1, wherein
    the variable intake air device includes a port switching valve configured to open and close the short port,
    the variable intake air device is configured to cause the port switching valve to close the short port to use the long port, and
    the variable intake air device is further configured to cause the port switching valve to open the short port to use the short port.

* * * * *